United States Patent [19]

Neuschütz

[11] 4,025,429
[45] May 24, 1977

[54] PROCESS FOR THE PURIFICATION OF INDUSTRIAL EFFLUENT

[75] Inventor: Heinz Neuschütz, Grenzach, Germany

[73] Assignee: Ciba-Geigy Corporation, Ardsley, N.Y.

[22] Filed: Sept. 19, 1975

[21] Appl. No.: 615,133

Related U.S. Application Data

[63] Continuation of Ser. No. 372,438, June 19, 1973, abandoned.

[30] Foreign Application Priority Data

July 23, 1972 Switzerland .................. 9527/72

[52] U.S. Cl. .................. 210/52; 210/54; 252/180; 260/69 N; 260/70 R; 260/72 R
[51] Int. Cl.$^2$ .................. C02B 1/20
[58] Field of Search .................. 210/42, 51–54, 210/59; 252/184, 319, 322, 323, 325, 180, 181; 260/249.9, 67 FP, 72 R, 29.4, 69 N, 70 R

[56] References Cited

UNITED STATES PATENTS

| | | | |
|---|---|---|---|
| 3,290,310 | 12/1966 | Morf et al. | 260/249.9 |
| 3,377,274 | 4/1968 | Burke et al. | 210/53 |
| 3,484,837 | 12/1969 | Odom et al. | 210/52 |
| 3,753,902 | 8/1973 | Stettler | 210/54 |

FOREIGN PATENTS OR APPLICATIONS

| | | | |
|---|---|---|---|
| 1,080,383 | 8/1967 | United Kingdom | 210/54 |
| 691,686 | 5/1953 | United Kingdom | 210/54 |
| 721,238 | 1/1955 | United Kingdom | 210/54 |

*Primary Examiner*—Thomas G. Wyse
*Assistant Examiner*—Peter A. Hruskoci
*Attorney, Agent, or Firm*—Edward McC. Roberts; Karl F. Jorda; Prabodh I. Almaula

[57] ABSTRACT

The present invention relates to a process for the purification of effluent which results in the textile, paper and leather industries and in the manufacture of dyestuffs, and which contains water-soluble, anionic dyestuffs or optical brighteners, the said process comprising the addition of a water-soluble formaldehyde condensation product to the said effluent and the subsequent removal of the occurring flocculate from the effluent.

5 Claims, No Drawings

PROCESS FOR THE PURIFICATION OF INDUSTRIAL EFFLUENT

This is a continuation of application Ser. No. 372,438, filed on June 19, 1973, now abandoned.

The present invention relates to a process for the purification of effluent which results in the textile, paper and leather industries and in the manufacture of dyestuffs, and which contains water-soluble, anionic dyestuffs or optical brighteners, the said process comprising the addition of a water-soluble formaldehyde condensation product to the said effluent and the subsequent removal of the occurring flocculate from the effluent.

The purification of industrial effluent poses a problem and proves exceedingly difficult to carry out, particularly where the removal of water-soluble organic substances is concerned.

In connection with effluent treatment, the effective decolorisation of residual liquors occurring in the dyeing of textiles, paper and leather, as well as the decolorisation of industrial effluent from dyestuff production, constitutes an urgent requirement.

Surprisingly, it has now been discovered that a very extentsive to complete decolorisation of manufacturing and dyeing effluent is achieved when this effluent is treated with formaldehyde condensation products as precipitation agents.

The process according to the invention is suitable, however, not only for the removal of dyestuffs but also, in the same manner, for the removal of optical brighteners.

The term 'residual liquors' used in the description of the process according to the invention relates in all cases, irrespective of the equipment involved, to the effluent arising in connection with dyeing processes. This effluent can come from the usual dyeing machines, such as are used for the dyeing of loose fibre material, slubbing, yarn, fabrics and knitwear, as well as from cleansing equipment, such as an open width washing machine.

The effluent treated according to the invention with the precipitation agent (precipitant) or flocculating agent is cleared of it flocculates by, for example, sedimentation, filtration, centrifuging or flotation.

The treatment of the effluent with the precipitants is performed at any desired temperature, e.g. 10° to 100° C, preferably however at room temperature, i.e. at a temperature of ca. 10° to 30° C.

A filtration of the effluent can optionally also be carried out under pressure.

The precipitant is advantageously employed in concentrations of 0.3 to 3 g, preferably 0.6 g to 1.2 g, per gram of dyestuff.

The dyestuff- or brightener-concentration of the effluent varies within wide limits, e.g. from 5° to 500 mg/1. Typical concentrations are around 50 to 100 mg.1.

The pH-value of the effluent also varies within wide limits, depending on the dyestuff contained therein. As a rule, the pH-value is however 1 to 10.

Especialy suitable water-soluble formaldehyde condensation products are, in particular, condensation products from dicyandiamide or dicyandiamidine, optionally urea, formaldehyde and, optionally, an alkylenepolyamine having 2 to 8 carbon atoms.

In the case of the alkylenepolyamines, these are, e.g.:
tetraethylenepentamine,
triethylenetretramine,
diethylenetriamine,
ethylenediamine,
propylenediamine or
butylenediamine.

Suitable products are, in particular, condensation products of formaldehyde/dicyandiamide/ethylenediamine or of dicyandiamidine/formaldehyde or of formaldehyde/urea/ dicyandiamide. Preferred products are obtained, for example, by condensation of 2 moles of formaldehyde with 1 mole of the reaction product of 2 moles of dicyandiamide with 1 mole of ethylenediamine or of the corresponding acid salt such as hydrochloride. Other likewise preferred products are produced by condensation of 1 mole each of urea, dicyandiamide and formaldehyde in the presence of acid such as hydrochloric acid, or by condensation of 1 mole of dicyandiamidine with 2 moles of formaldehyde.

Further advantageous products are obtained by condensation of 3 to 4 moles of dicyandiamide with 7 moles of formaldehyde and 1 mole of the tetrahydrochloride of triethylenetetramine.

The flocculants used according to the invention can also be employed in combination with other flocculants. In certain cases, for example, it has proved advantageous to combine iron salts such as, e.g., iron-II-sulphate or iron-III-chloride. In the case of the concomitant use of iron salts, the pH-value of the effluent is advantageously ajdusted to a value of 7 or higher. Where need arise in effecting flocculation, polyelectrolytes are added as flocculating auxiliaries, which promote the formation of big flocks. These are, in particular, high-molecular, water-soluble polymers, e.g. based on acrylic acid, which can be anionic, cationic or neutral.

With regard to the water-soluble dyestuffs, those which are removed to a particular extent are the dyestuffs that owe their water-solubility to the presence of acid groups such as carboxylic acid groups, especially, however, to the presence of sulphonic acid groups or acid sulphuric acid ester groups. The said dyestuffs can be reactive or nonreactive to the fibre material to be dyed, and can belong moreover to the most diverse classes, such as, for example, to those of the styryl, oxazine, formazan, quinophthalone, triphenylmethane, xanthene, perinone, azomethine, nitro, nitroso, acridone or phthalocyanine dyestuffs, or particularly of the metallised or metal-free or metallisable mono- or polyazo dyestuffs.

Dyestuffs which are particularly well removed are those known as direct dyestuffs. The purification capacity is however appreciable also in the case of metal-complex dyestuffs.

It is possible by a suitable choice of precipitants to extract according to the invention up to 100% of the contamination concerned from the effluent to be treated.

The process according to the invention, however, is not only suitable for the decolorisation of residual liquors in the dyeing of textiles, paper or leather, but also able to render good service where it is required to remove residues of optical brightners from washing and bleaching liquors wherein the optical brighteners likewise have anionic character.

Such brighteners are, e.g., in the following classes:
4,4'-bis-(acylamino)-stilbene-2,2'-disulphoic acids, 4,4'-bis-(triazinylamino)-stilbene-2,2'-disulphonic acids,
4,4'-bis-(azolyl)-stilbene-2,2'-disulphonic acids,
stilbyl-naphthotriazoles,
bis-(benzoxazol-2-yl)-derivatives,
monomethine-cyanines,
2,7-bis-(aroylamino)-dibenzothiophenedioxide-3,6-disulphonic acids,
1,3-diaryl-pyrazolines,
styrylbenzoxyzoles,
bis-styrylaryl-compounds,
bis-benzoxyzolylaryls or
oxadizoles.

Production effluent can contain, besides the actual dyestuffs and optical brighteners, also the corresponding intermediates occurring during the manufacturing processes.

Percentages in the following examples are expressed in per cent by weight.

EXAMPLE 1

There is added to 500 ml of dyestuff solution (100 mg of dyestuff per litre of water) in a beaker, with stirring, the appropriate amount of precipitant in the form of a 10% solution, and the pH-value of the solution subsequently adjusted to the desired value by means of 0.1N sodium hydroxide solution or 0.1N sulphuric acid. The test solution is stirred for 15 minutes and then, for assessment of the settling behaviour, allowed to stand for 15 hours. After filtration, the dyestuff concentration is photometrically determined.

The photometric concentration determination is performed as follows: A calibration curve is obtained with pure dyestuff (mg of dyestuff/litre of water against measured extinction at the absorption maximum of the dyestuff in the visible spectrum). This calibration curve is used to determine the residual concentration of the dyestuff.

Aqueous solutions of the following dyestuffs are used:

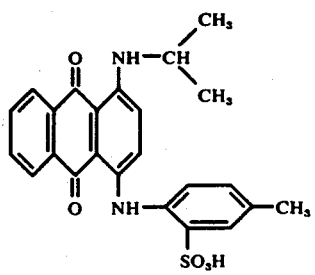
(1)

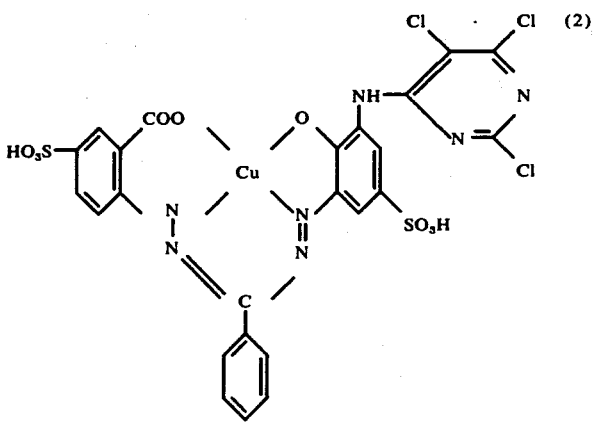
(2)

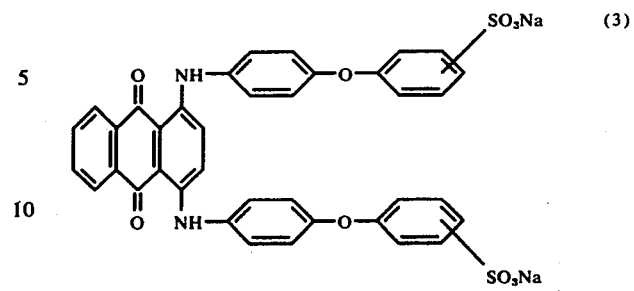
(3)

The following products are used as precipitants or flocculants:

A : pre-condensate from 1 mole of dicyandiamidine and 1 mole of formaldehyde,
B : pre-condensate from 1 mole of dicyandiamide, 2.2 moles of formaldehyde, 1.3 moles of ethylenediamine and 0.8 mole of $NH_4Cl$,
C : A : B — 1 : 1 - mixture,
D : A : B — 1 : 2 - mixture.

The results are listed in the following Table I.

Table I

| Precipitant | g of precipitant per g of dyestuff | Residual concentration of the dyestuff in mg/l | | |
|---|---|---|---|---|
| | | (1) | (2) | (3) |
| A with pH 7 | 1,0 | 38 | — | 68 |
| | 1,2 | 27 | — | — |
| | 1,4 | 18 | — | 42 |
| | 2,0 | 9 | 17 | 0 |
| | 3,0 | — | 5 | — |
| | 4,0 | — | 3 | — |
| B with pH 7 | 0,4 | 33 | — | 58 |
| | 0,6 | 1 | — | 0 |
| | 0,8 | 1 | 5 | 0 |
| | 1,0 | — | 3 | 0 |
| | 1,2 | — | 3 | — |
| | 1,4 | — | 2 | — |
| C with pH 7 | 0,6 | 28 | — | 66 |
| | 0,8 | 9 | — | 1 |
| | 1,0 | 4 | — | 0 |
| | 1,2 | 4 | 6 | 0 |
| | 1,4 | — | 2 | — |
| | 2,0 | — | 2 | — |
| C with pH 3 | 0,6 | 25 | — | 72 |
| | 1,0 | 6 | — | 1 |
| | 1,2 | 5 | — | 2 |
| | 1,4 | 5 | — | 1 |
| D with pH 3 | 0,4 | 38 | — | 74 |
| | 0,6 | 18 | — | 0 |
| | 0,8 | 8 | — | 2 |
| | 1,0 | — | — | 2 |
| | 1,2 | 5 | — | — |

EXAMPLE 2

There is added to 500 ml of dyestuff solution (100 mg of dyestuff per litre of water) in a beaker, with stirring, 5 ml of a 1% solution of the precipitant (10 g of precipitant to 1 litre of water), and the pH-value adjusted to the desired value (pH = 3, 7 or 10) by means of 0.1N sulphuric acic or 0.1N sodium hydroxide solution; the solution is then stirred for 15 minutes. The test solution is afterwards poured into a 500 ml measuring cylinder and, for assessment of the settling behaviour, allowed to stand for 15 hours. After filtration, the dyestuff concentration is photometrically determined. In addition, the TOC (total organic carbon) before and after precipitation (in the filtrate) is determined.

The results are contained in the following Table II:
F : reduction of colour intensity in %, TOC : reduction of the TOC in %
The dyestuffs (4) to (11) correspond to the following formulae:
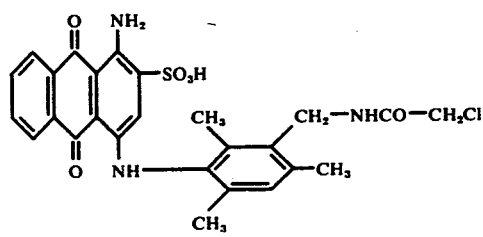
(4)
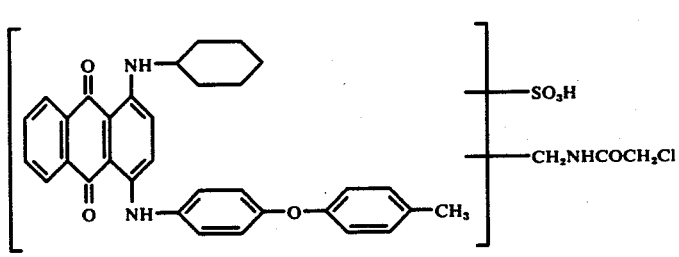
(5)
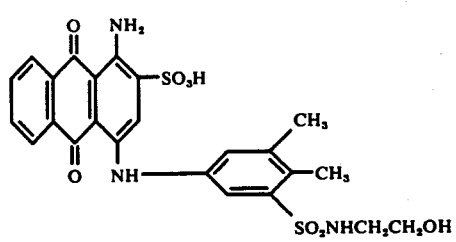
(6)
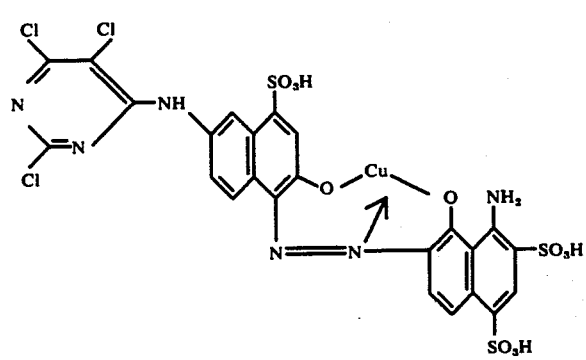
(7)
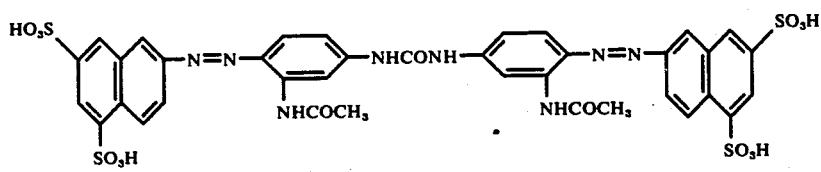
(8)
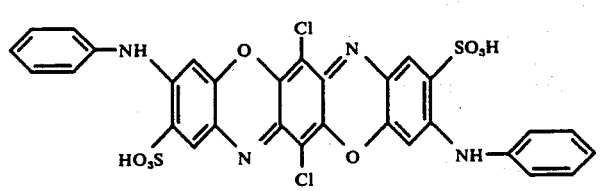
(9)

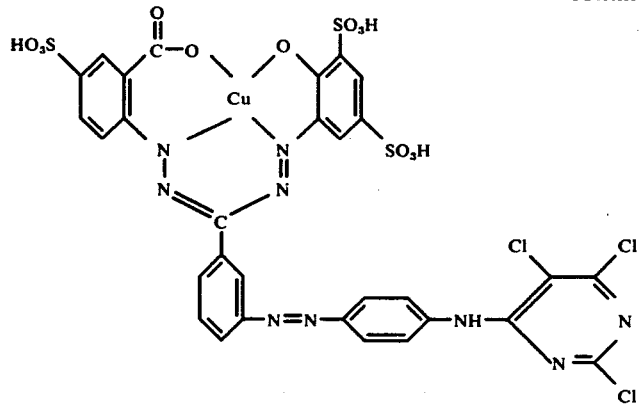

(10)

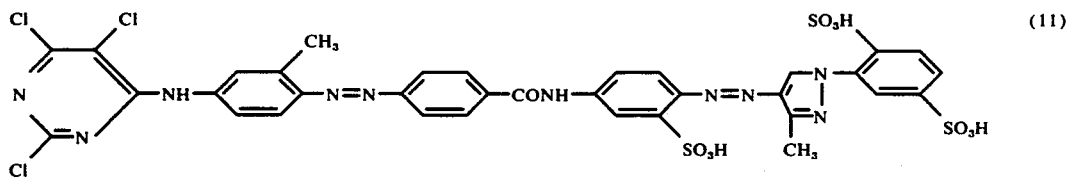

(11)

Table II

| Dye-stuff | PH | A 3 F | A 3 TOC | A 7 F | A 7 TOC | A 10 F | A 10 TOC | Precipitant B 3 F | Precipitant B 3 TOC | Precipitant B 7 F | Precipitant B 7 TOC | Precipitant B 10 F | Precipitant B 10 TOC | C 3 F | C 3 TOC | C 7 F | C 7 TOC | C 10 F | C 10 TOC |
|---|---|---|---|---|---|---|---|---|---|---|---|---|---|---|---|---|---|---|---|
| (4) | | 92 | 87 | 95 | 90 | 94 | 87 | 99 | 80 | — | — | — | — | 99 | 77 | 99 | 80 | 99 | 83 |
| (5) | | 98 | 74 | 98 | 86 | 97 | 89 | 96 | 74 | — | — | — | — | 97 | 77 | 96 | 77 | 99 | 83 |
| (6) | | — | — | 92 | 81 | 92 | 81 | 99 | 73 | — | — | 99 | 76 | 99 | 86 | 99 | 86 | 99 | 84 |
| (7) | | — | — | 95 | 55 | — | — | 99 | 76 | 99 | 83 | 96 | 83 | 99 | 79 | — | — | — | — |
| (8) | | 97 | 66 | 96 | 75 | 95 | 75 | 98 | 66 | 98 | 66 | 98 | 66 | 97 | 62 | 98 | 69 | 97 | 66 |
| (9) | | — | — | — | — | — | — | 98 | 69 | 98 | 69 | 98 | 72 | 94 | 65 | 98 | 75 | 97 | 73 |
| (10) | | — | — | — | — | — | — | 97 | 63 | 98 | 63 | 98 | 63 | 99 | 63 | 98 | 67 | 95 | 63 |
| (11) | | — | — | — | — | — | — | 99 | 73 | 99 | 80 | 99 | 80 | 99 | 73 | — | — | — | — |

EXAMPLE 3

200 ml of a solution containing 0.1 g/l of the optical brightener of the formula

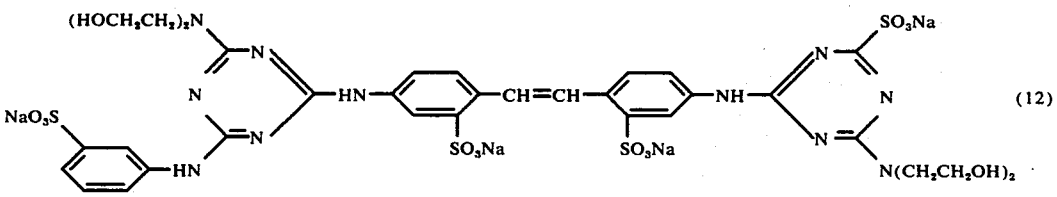

(12)

is, if necessary, adjusted with 2N sulphuric acid or 2N sodium hydroxide solution to the desired pH-value (pH = 3, 7 and 10) and, with stirring, the appropriate amount of the flocculant B in the form of a 2% solution (0.5, 1.0 or 2.0 ml) added. The pH-value is adjusted if necessary. After a settling time of 4 hours, the solution is filtered, and the elimination of the fluorescence caused by the brightener determined by comparison with a dilution series of known concentration at 366 nm.

The obtained results are given in the following table.

| g of precipitant / g of brightener | 0.5 | 1.0 | 2.0 |
|---|---|---|---|
| elimination of | | | |

| g of precipitant / g of brightener | 0.5 | 1.0 | 2.0 |
|---|---|---|---|
| fluorescence in % at pH 3 | 95 | 95 | 95 |
| 7 | 95 | 95 | 95 |
| 10 | 60 | 95 | 95 |

EXAMPLE 4

The total effluent from a production of dyestuff, whereby acid and basic dyestuffs are produced, is continuously neutralised with calcium hydroxide in a sufficiently large vessel permitting a holding time of 2 hours, and simultaneously solutions of iron-III-chloride or iron-II-sulphate, flocculant B and polyacrylic acid added. The thorough mixing together of the components is effected by means of compressed air. After 2 hours holding time, the mixture is allowed to flow into a settling tank, where the occurring precipitate is separated. The degree of decoloration in the cleared effluent is measured. In addition, the TOC-reduction between inflow and outflow is determined.

The results are given in the following table.

| Test | Added amounts | | | | Mean decoloration % | Mean TOC-reduction % |
|---|---|---|---|---|---|---|
| | Flocculant g/l | FeCl₃ g/l | FeSO₄ g/l | Polyacrylic acid g/l | | |
| 1 | 0.5 | 0.5 | — | 0.005 | 90 | 11 |
| 2a | 0.2 | 0.2 | — | 0.005 | 81 | 18 |
| 2b | 0.2 | — | 0.2 | 0.005 | 81 | 15 |

EXAMPLE 6

An amount of 200 ml of dyestuff solution (containing 0.1 g of dyestuff per litre of solution) is adjusted, if necessary, with 2N sulphuric acid or 2N sodium hydroxide solution to have the desired pH-value (pH = 3 or 7) and, with stirring, the desired amount of 2% flocculant-solution (1 or 2 ml) added. The pH-value is afterwards readjusted if necessary. After 15 hours' settling time, filtration is performed and the degree of decoloration measured. The obtained results are given in the following Table

| Employed dyestuff of the formula | (1) | | (3) | |
|---|---|---|---|---|
| g of precipitant E/ g of dyestuff | 1 | 2 | 1 | 2 |
| decoloration in % at pH 7 | 64 | 89 | 44 | 99 |
| 3 | 82 | 99 | 66 | 94 |

The precipitant or flocculant E is produced as follows:

34 kg of dicyndiamide is refluxed together with 18 kg of urea and 5.5 kg of ammonium chloride in 75 kg of 30% hydrochloric acid for 6 hours. An addition is then made of 80 kg of 37.4% aqueous formaldehyde solution, and the whole stirred for 6 hours at 75° to 85° C. After completion of condensation, there is added to the solution an amount of 10 kg of glacial acetic acid.

EXAMPLE 7

There is added to 500 ml of dyestuff solution (containing 1 g of printing paste to 1 litre of water, corresponding to a content of ca. 50 mg of dyestuff per litre of solution) in a beaker, with stirring, 5 ml of a 1% solution of flocculant B. After a settling time of 15 hours, filtration is carried out and decoloration and TOC determined. The results are given in the following table.

| Dyestuff of the formula | 13 | 14 | 15 | 16 | 17 | 18 | 19 | 20 | 21 |
|---|---|---|---|---|---|---|---|---|---|
| decoloration in % | 100 | 100 | 100 | 100 | 100 | 100 | 100 | 100 | 100 |
| TOC-reduction in % | 70 | 43 | 71 | 85 | 78 | 22 | 72 | 4 | 88 |

The dyestuffs correspond to the following formulae:

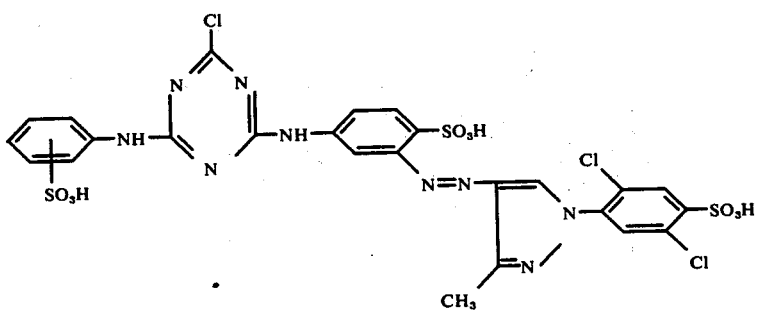

(13)

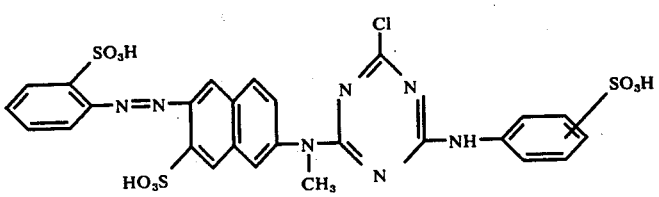

(14)

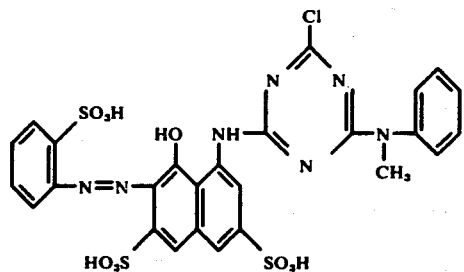
(15)
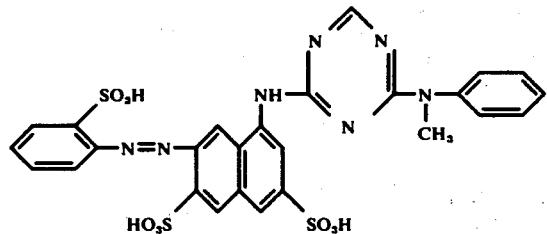
(16)
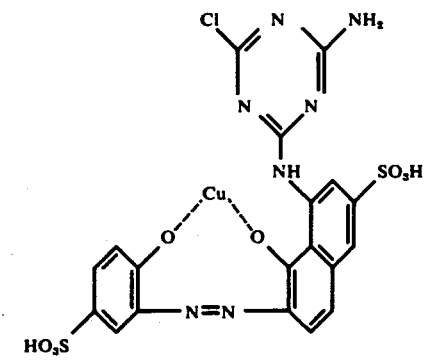
(17)
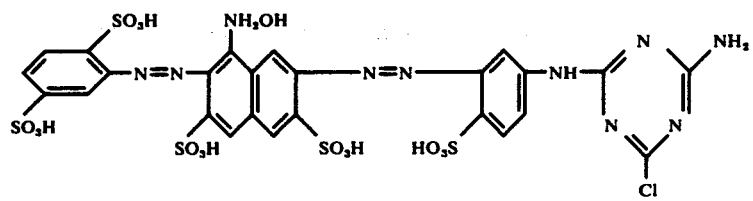
(19)
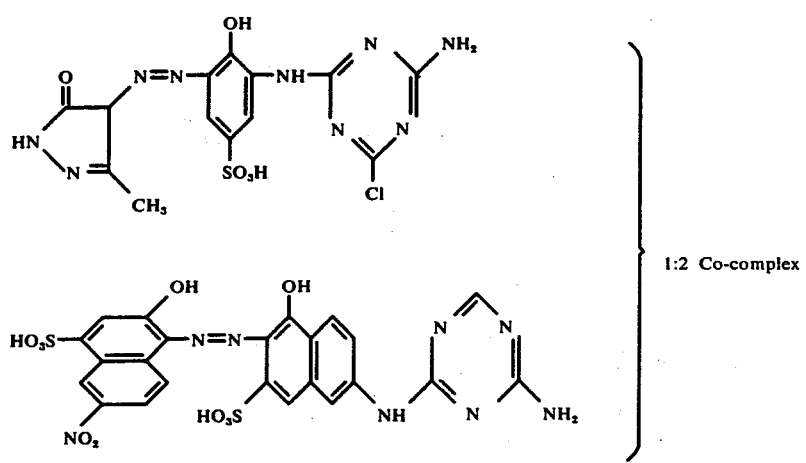
(20)
1:2 Co-complex

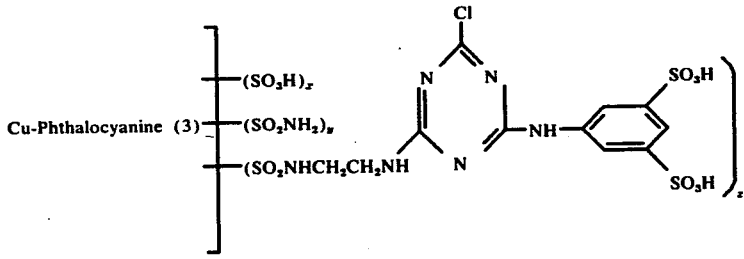

EXAMPLE 8

There is added to 200 ml of dyestuff solution (containing 1 g of printing paste per litre of water, corresponding to a content of ca. 50 mg of dyestuff per litre of solution) in a beaker, with stirring, 0.6 ml of a 1% iron-II-sulphate solution, and the pH-value subsequently adjusted to 7 with 2N sodium hydroxide solution. There is then added 0.1 ml of 3% hydrogen peroxide solution, and an addition made to the obtained solution of 1 ml of 1% flocculant solution. After 1 minute stirring, an amount of 5 ml of a 0.1% polyacrylic acid solution (flocculating auxiliary) is added and the whole stirred for a further minute.

After a settling time of 15 hours, filtration through a glass frit is performed, and decoloration and TOC determined. The results are given in the following table.

| Dyestuff of the formula | 13 | 14 | 15 | 16 | 17 | 18 | 19 | 20 | 21 |
|---|---|---|---|---|---|---|---|---|---|
| Decoloration in % | 100 | 100 | 100 | 100 | 100 | 100 | 100 | 100 | 100 |
| TOC-reduction in % | 73 | 48 | 74 | 88 | 83 | 55 | 76 | 38 | 91 |

I claim:

1. A process for the purification of aqueous effluent which results in the textile, paper and leather industries and in the manufacture of dyestuffs and optical brighteners, and which contain water-soluble, anionic dyestuffs or optical brighteners, said process comprising mixing said effluent with a water-soluble condensation product from dicyandiamide, formaldehyde, ethylene diamine and ammonium chloride in a ratio of 2.2 moles of formaldehyde, 1.3 moles of ethylene diamine and 0.8 moles of ammonium chloride per mole of dicyandiamide, in an amount corresponding to 0.03 to 3 grams of said condensation product per gram of dyestuff and optical brightener, and the subsequent removal of the occurring flocculate from the effluent.

2. The process according to claim 1, wherein the effluent is purified at 10 to 100° C.

3. The process according to claim 2, wherein the effluent is purified at 10 to 30° C.

4. The process according to claim 1, wherein an iron salt is added to the effluent.

5. A flocculant composition for the purification of effluent which results in the textile, paper and leather industries and in the manufacture of dyestuffs and optical brighteners, and which contains water-soluble, anionic dyestuffs or optical brighteners, said flucculant composition containing a water-soluble condensation product from dicyandiamide, formaldehyde, ethylene diamine and ammonium chloride in a ratio of 2.2 moles of formaldehyde, 1.3 moles of ethylene diamine, and 0.8 moles of ammonium chloride per mole of dicyandiamide.

* * * * *